United States Patent [19]

Warneke

[11] 4,120,940

[45] Oct. 17, 1978

[54] DIRECT PRODUCTION OF COARSE PARTICLE INORGANIC FLUORIDES

[75] Inventor: William Carl Warneke, Lakeland, Fla.

[73] Assignee: Borden, Inc., Columbus, Ohio

[21] Appl. No.: 810,047

[22] Filed: Jun. 27, 1977

[51] Int. Cl.$^2$ .......................... C01F 5/28; C01F 11/22
[52] U.S. Cl. .................................................. 423/490
[58] Field of Search ......................................... 423/490

[56] References Cited

U.S. PATENT DOCUMENTS

| 1,747,133 | 2/1930 | Pirani | 423/490 X |
|---|---|---|---|
| 2,914,474 | 11/1959 | Hillyer et al. | 423/490 X |
| 3,132,922 | 5/1964 | Goodenough et al. | 423/490 X |
| 3,357,788 | 12/1967 | Ross | 423/490 |

FOREIGN PATENT DOCUMENTS

| 548,088 | 10/1957 | Canada | 423/490 |
|---|---|---|---|
| 540,075 | 10/1941 | United Kingdom | 423/490 |
| 194,789 | 6/1967 | U.S.S.R. | 423/490 |

*Primary Examiner*—Earl C. Thomas
*Attorney, Agent, or Firm*—Daniel D. Mast; George P. Maskas; George A. Kap

[57] ABSTRACT

Relatively large particles of calcium carbonate or magnesium oxide are reacted with a solution of ammonium fluoride or with aqueous hydrofluoric acid to form particles of calcium or magnesium fluoride, similar in size to the starting material by pseudomorphic alteration.

4 Claims, No Drawings

DIRECT PRODUCTION OF COARSE PARTICLE INORGANIC FLUORIDES

BACKGROUND OF THE INVENTION

In the past calcium fluoride has been produced by various dry processes. For instance, U.S. Pat. No. 2,573,704, N. Gilbert et al., teaches making calcium fluoride by reacting calcium carbonate with gaseous hydrogen fluoride. In this process hot waste gases containing hydrogen fluoride are passed through a bed of ¼–2 inch oolitic and pisolitic limestone. The hot gases react with the outer surface of the limestone, producing calcium fluoride which decrepitates as a powder. The calcium fluoride rich portion is separated by screening, and the coarser material composed mainly of limestone is recycled.

Another dry process is described in Ross's U.S. Pat. No. 3,357,788 wherein calcium carbonate is reacted with ammonium bifluoride or with ammonium fluoride. The calcium fluoride produced has an average particle size of about 8 microns.

Both of these dry process patents refer to wet processes as the undesirable approach to produce calcium fluoride. The Ross patent states that large volumes of solutions must be held at their boiling temperature for several hours in order to develop calcium fluoride crystals from extremely fine particles to desirable sizes such as about one micron average diameter.

The Gilbert patent states that various types of wet treatments of partially reacted limestone for removal of calcium fluoride have been suggested, but that these methods are generally too expensive and complicated for commercial production.

Other patents of interest include U.S. Pat. Nos. 3,551,332; 3,529,929, and less pertinent 2,213,907, 2,781,244, 2,781,245, and 2,839,369.

The search conducted was in Classes 23, 423 and 210.

The processes in the known art produce a finely-divided powder or small particles in a large volume of liquid which requires filtration and drying. The drying step is necessarily difficult, and energy and time-consuming because the calcium fluoride is finely divided and thus difficult to dry.

With the present emphasis on energy and mineral conservation throughout the world, there is real value in the improvements provided by the present invention. Not only does this invention offer a method of removing fluorides from solutions that might possibly cause disposal problems, but also produces a potentially valuable product that can easily be dried with essentially no dust or handling problems.

SUMMARY OF THE INVENTION

It is an object of this invention to produce a coarse particle calcium fluoride product utilizing an economical process.

It is a further object to provide an economical process for producing calcium fluoride from limestone which avoids the usual finely-divided powder as the product with the attendant drying and handling problems.

The invention involves starting with a relatively coarse particle of limestone and retaining that same coarse particle in the calcium fluoride product formed. The particle size and particle shape of the limestone is essentially retained in the product formed. None of the commercial processes utilized in the prior patents or known art has accomplished this.

DESCRIPTION OF THE PREFERRED EMBODIMENTS

Granular limestone, preferably oolitic limestone, is reacted with aqueous hydrofluoric acid. Alternatively, an aqueous solution of ammonium fluoride is reacted with the coarse grain limestone to produce the $CaF_2$ product as follows:

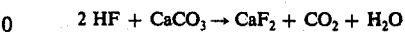

$2 HF + CaCO_3 \rightarrow CaF_2 + CO_2 + H_2O$

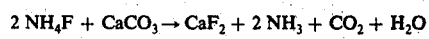

$2 NH_4F + CaCO_3 \rightarrow CaF_2 + 2 NH_3 + CO_2 + H_2O$

Granular magnesium oxide can also be reacted with aqueous solutions of hydrofluoric acid or ammonium fluoride to produce granular magnesium fluoride.

The following examples illustrate the invention.

EXAMPLE 1

Eighty two grams of 28 × 65 mesh limestone was added to 500 grams of an aqueous solution of 6.8% hydrogen fluoride. (6.8% HF Acid). The mixture was reacted at 130° F for 60 minutes with constant stirring.

The $CaF_2$ product was dried at 200° F and an analysis showed it to contain 40.8%F (84% $CaF_2$) and 2.0% $CO_2$. The 28 × 65 mesh size is essentially retained in the $CaF_2$ product. There are little or no fines in the resultant product and, for this reason, the product is easily dried.

EXAMPLE 2

Forty four grams of 20 × 200 mesh limestone was added to 500 grams of an aqueous solution containing 4% HF. The mixture was reacted at 100°–140° F for 60 minutes. The product was calcined for 1 hour at 1000° F to drive off volatiles. The calcined product contained 43.6% fluorine (90% $CaF_2$). This product was essentially the same size as the starting limestone.

EXAMPLE 3

Seventy-five grams of 20 × 200 mesh calcium carbonate was reacted with 500 grams of an aqueous solution containing 6.8% HF. The mixture was reacted at 100°–140° f for 60 minutes. The product was calcined at 1000° F for 1 hour and assayed 46.4% F (95% $CaF_2$). The product had essentially the same size distribution as the starting limestone.

EXAMPLE 4

Ninety three grams of 20 × 200 mesh calcium carbonate was reacted with 500 grams of aqueous 10.9% HF at 100°–140° F for 60 minutes. The calcined product contained 46% F (94% $CaF_2$) and was essentially the same size as the starting limestone.

EXAMPLE 5

One-hundred grams of 20 × 65 mesh limestone was added to an aqueous solution of 20% HF. The sample was heated to 150° F for 1 hour. The liquid was decanted and fresh solution containing 20% HF added and mixture reheated to 150° F for another hour. The product was dried and calcined at 1000° F for an hour. It assayed 47.9% F and 50.4% calcium (98.3% $CaF_2$ based on F). The product was about the same size as the starting limestone.

EXAMPLE 6

Fifty grams of 20 × 65 mesh limestone was reacted with 208 grams of an aqueous solution containing 9.1% ammonium fluoride for 1 hour at about 150° F. The liquid was decanted and an additional 208 grams of an aqueous 9.1% NH₄F solution added and heated to 150° F to boiling for 1 hour. The product was dried and calcined at 1000° F for 1 hour and assayed 50.7% Ca and 48% F. The size of the product was similar to the starting limestone.

EXAMPLE 7

Fifty grams of 35 × 100 mesh 67% MgO* was added to 700 grams of an aqueous solution containing 5.4% HF and reacted at 160° F for 2 hours. The liquid was decanted, 600 grams of the 5.4% HF solution added and reacted for an additional 2 hours at 160° F. The product was dried and calcined at 1000° F for 1 hour. It assayed 60.0% F and 36.9% Mg. The size distribution of the product was similar to the starting material.

EXAMPLE 8

Fifty grams of 35 × 100 mesh 67% MgO* was added to 250 grams of an aqueous solution of 15.2% HF. This mixture was reacted at 160° F for 2 hours. The liquid was decanted, 250 more grams of the 15.2% HF solution added, and mixture reacted for 2 more hours at 160° F. The product was dried and calcined at 1000° F for 1 hour. Analysis indicated 60.0% F and 37% Mg. The size distribution of the product as essentially the same as the starting MgO.

EXAMPLE 9

Fifty grams of 67% MgO* was reacted with 346 grams of an aqueous solution containing 9.1% ammonium fluoride for an hour at about 150° F. The liquid was decanted and an additional 346 grams of aqueous 9.1% ammonium fluoride added. This mixture was re-heated to about 150° F to boiling for 1 hour. The product was dried and calcined at 1000° F for an hour. Chemical analysis indicated 37.4% Mg and 57% F. The size distribution of the product was similar to the starting MgO.
*The magnesium oxide was granular magnesium 67 supplied by Basic, Inc. This product is 67.5% MgO, 1.1% CaO, 0.03% Fe₂O₃, 0.2% Al₂O₃.

Although the strict chemical reactions involved in this discussion are simple, the exact mechanism by which these pseudomorphic changes take place within a particle or other physical form are not as well understood. It is known that large particles of calcium carbonate can produce almost the same size and shape calcium fluoride particles by using the procedures of the examples. A seashell composed of calcium carbonate when reacted with hydrofluoric acid will result in a duplicate seashell composed of calcium fluoride (a pseudomorph). Likewise, using the processes of this invention, various physical forms including relatively large particles of calcium carbonate when reacted with HF will result in duplicate large particles of calcium fluoride, a pseudomorph or false form. In the seashell or in the large particle, the calcium ions remain, and the carbonate anions are replaced with fluoride anions. The solid reactant is preferably one having an average particle size of from about 100 to 1000 microns.

The advantages of the present process include avoiding the production of finely-divided forms that are very difficult to dry, with resultant dust and pollution problems. The particle sizes desired are 16 × 100 mesh and preferably 20 × 65 mesh. The temperature range maintained to complete the reaction is from about 90° F to boiling and preferably from about 110° to 150° F. The reaction time may be from ½ to 5 hours. The drying temperature can be varied and is not critical but is generally about 180° to 225° F. To remove the remaining water and other volatiles, the material is calcined at 1000° F for 1 hour.

The particle size of the oolitic limestone used as the preferred starting material is about 0.02 inch, which is about one hundred times larger than the calcium carbonate used in the Ross patent (U.S. Pat. No. 3,357,788).

Typical screen analysis of the limestone starting material (reactant) and the CaF₂ product follow.

CaF₂ SCREEN ANALYSIS

| Tyler Mesh | Reactant Limestone Percentages | | CaF₂ Product Percentages | |
|---|---|---|---|---|
| | On | Passing | On | Passing |
| 20 | 1.9 | 98.1 | 0.8 | 99.2 |
| 28 | 12.0 | 88.0 | 7.4 | 92.6 |
| 35 | 25.4 | 74.6 | 14.5 | 85.5 |
| 48 | 48.4 | 51.6 | 33.1 | 66.9 |
| 65 | 68.3 | 31.7 | 48.0 | 52.0 |
| 100 | 87.3 | 12.7 | 65.3 | 34.7 |
| 150 | 95.4 | 4.6 | 78.0 | 22.0 |
| 200 | 98.2 | 1.8 | 87.3 | 12.7 |
| Pan | 100.0 | — | 100.0 | — |

I claim:

1. A process for making a controlled size and shape particulate material selected from the group consisting of calcium fluoride and magnesium fluoride substantially free of finely-divided powder resulting from combining
   (1) a solid coarse particle reactant selected from calcium carbonate and magnesium oxide and having an average particle size greater than about 100 microns and the particle shape desired in the final product, and
   (2) a dilute aqueous reactant solution selected from solutions of hydrofluoric acid and ammonium fluoride that completely mixes with said solid reactant to form a reactive mixture,
raising the temperature of the reactive mixture to from 90° F to boiling temperature for from ½ to 5 hours to cause reaction between (1) and (2) and to form a coarse particulate product, and separating said particulate product from the mixture by drying at from 180° to 225° F followed by calcining at about 1000° F for a sufficient time to remove remaining water without disturbing the particle size and shape of said product, which particle size is substantially identical to that of said solid reactant.

2. In a process for producing calcium fluoride having a controlled, coarse particle size and substantially free of finely-divided powder, the steps comprising:
   selecting a limestone having an average particle size greater than about 100 microns,
   forming a reactive mixture by adding to the limestone a dilute aqueous fluoride solution selected from solutions of hydrofluoric acid and ammonium fluoride,
   elevating the temperature of the reactive mixture to from about 90° F to boiling temperature to cause calcium fluoride to form,
   drying the calcium fluoride at a temperature of from about 180°–225° F and then calcining at about 1000° F to remove the water, and
   recovering the calcium fluoride product without substantially reducing the particle size of the particulate product.

3. In a process for producing magnesium fluoride having a controlled, coarse particle size and substantially free of finely-divided powder, the steps comprising:

selecting magnesium oxide having an average particle size greater than about 100 microns, forming a reactive mixture by adding to the magnesium oxide a dilute aqueous fluoride solution selected from solutions of hydrofluoric acid and ammonium fluoride, elevating the temperature of the reactive mixture to from 90° F to boiling temperature to cause magnesium fluoride to form, drying the magnesium fluoride at a temperature of from about 180°–225° F and then calcining at about 1000° F to remove the water, and recovering the magnesium fluoride product without substantially reducing the particle size of the particulate product.

4. The process of claim 1 wherein the solid, coarse particle reactant has an average particle size of from about 100 to 1000 microns.

* * * * *